Oct. 25, 1960 W. C. PERKINS 2,958,051
LOW DISTORTION BALANCED MODULATOR
Filed Sept. 19, 1957 2 Sheets-Sheet 1

FIG I

INVENTOR.
WILLIAM C. PERKINS
BY Moody and Goldman
ATTORNEYS

LOW DISTORTION BALANCED MODULATOR

Filed Sept. 19, 1957 2 Sheets-Sheet 2

INVENTOR.
WILLIAM C. PERKINS
BY Moody and Goldman
ATTORNEYS

United States Patent Office 2,958,051
Patented Oct. 25, 1960

2,958,051

LOW DISTORTION BALANCED MODULATOR

William C. Perkins, Cedar Rapids, Iowa, assignor to Collins Radio Company, Cedar Rapids, Iowa, a corporation of Iowa Filed Sept. 19, 1957, Ser. No. 684,981

7 Claims. (Cl. 332—47)

This invention relates generally to balanced modulators utilized for suppressing a carrier frequency with minimum intermodulation distortion.

Balanced modulators are often used for generating a double-sideband suppressed carrier signal. Furthermore, a single-sideband signal can be obtained by filtering one of its sidebands. However, conventional balanced modulators are imperfect in two ways: (1) they do not obtain complete carrier frequency suppression, and (2) they distort the modulated signal. Imperfect carrier suppression is caused by the inability to obtain perfect balancing of impedances at radio frequencies, such as inability to obtain transformers with perfectly balanced halves at radio frequencies. A low signal-to-distortion ratio is caused by: (*a*) operating on portions of the diode characteristic having pronounced second and higher orders of nonlinearities, and (*b*) mismatching between input and output portions of the balanced modulator which reduces the efficiency of transfer of the desired heterodyned components without substantially decreasing noise and the distortion causing intermodulation products. Thus, these imperfections cause various types of distortion in the sideband output, low signal-to-noise ratio, and imperfect carrier suppression.

This invention largely overcomes the above stated practical difficulties in a balanced modulator to permit a higher order of carrier suppression and a higher signal-to-distortion ratio than obtainable from any balanced modulator heretofore known. The invention enables ease in carrier suppression by minimizing unbalanced reactive components so that a resistive balance is possible. The removal of reactance by the invention permits obtaining balanced conditions by purely resistive adjustment with transformers operated at high radio frequencies. Such balancing would otherwise be impossible because reactive components are not readily controllable in the design of radio-frequency transformers. Furthermore, the invention enables input and output impedance matching of the modulator to permit maximum desired energy transfer through it to obtain a resultant improvement in signal-to-noise ratio as well as signal-to-distortion ratio.

The invention has an input transformer having its primary connected to a signal source which may be audio. The secondary of the transformer comprises a portion of a parallel resonant input circuit. Resistance means is connected across the input parallel resonant circuit to enable impedance matching of the signal path through the modulator. The resistance means is center-tapped and connected to one side of a carrier source which may be radio frequency. An output transformer is provided having two pairs of primary windings and a secondary winding. The windings of each pair are connected in a series-aiding manner by second and third resistance means respectively. Each pair of windings is part of a parallel resonant output circuit. A first pair of asymmetric conductors connects the opposite sides of the first pair of output transformer windings to the input resonant circuit. A second pair of asymmetric conductors connects the opposite sides of the second pair of output transformer windings to the input resonant circuit. The carrier source has its other side connected adjustably to the second and third resistance means. With respect to the input resonant circuit, the first pair of diodes have one polarity, and the second pair of diodes have the opposite polarity. The carrier source is preferably much higher in frequency than the first input signal and is preferably squarewave in form with an effective amplitude of about ten times greater than the peak amplitude of the first signal. The output of the invention is taken from the secondary of the output transformer.

Further objects, features and advantages of this invention will be apparent to a person skilled in the art upon further study of the specification and accompanying drawings, in which.

Figure 1:
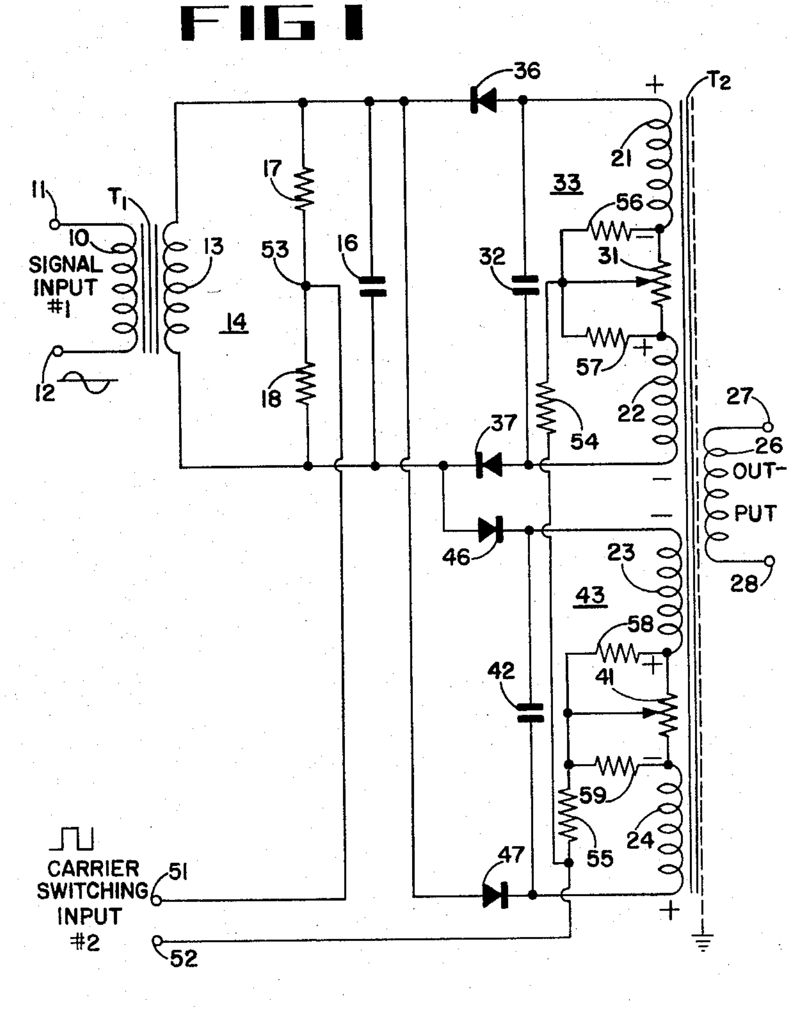
Figure 1 is a schematic diagram of a form of the invention.

Now referring specifically to Figure 1, an input transformer $T_1$ has a primary 10 connected to input terminals 11 and 12 which receive a first input signal, which might be a voice frequency signal. The secondary 13 of transformer $T_1$ is connected in a parallel resonant circuit 14 comprising a capacitor 16 connected across winding 13. Resonant circuit 14 is fixed-tuned to the frequency of the carrier input wave. A resistance means consisting of equal series-connected resistors 17 and 18 is connected across resonant circuit 14. At the tuned frequency the input reactance is zero, although not at audio frequencies where, however, the reactance is of little consequence. Therfore, the combind resistance of resistors 17 and 18 shunts the circuit input and controls the net resistance provided by resonant circuit 14. Hence, the choice of values for resistors 17 and 18 enables an impedance match for the signal path through the balanced modulator to maximize the desired signal power flow. Since all of the elements of the modulator are passive, impedance-matched conditions minimize the attenuation of the signal by the circuit.

The modulator circuit also includes an output transformer $T_2$ which has two pairs of primary windings, with the first pair including windings 21 and 22 and the second pair including windings 23 and 24. A fifth winding 26 provides the output of the invention to a pair of terminals 27 and 28. Transformer $T_2$ has an electrostatic shield 30 between output winding 26 and the other windings.

A first potentiometer 31 serially connects windings 21 and 22 with series-aiding polarity. Similarly, a second potentiometer 41 serially connects the second pair of primary windings 23 and 24 with series-aiding polarity. A capacitor 32 is connected across windings 21 and 22, and a second capacitor 42 is connected across windings 23 and 24 to resonate the output transformer at the carrier frequency.

However, resonating circuits 33 and 43 are designated for convenience of nomenclature and are more complex than may appear because there cannot be any separate resonance by circuits 33 and 43. They are actually a single resonant circuit due to their mutual coupling through the core of transformer $T_2$. Hence, each of the resonating circuits has coupled within it the reactance of the other circuit. The values of capacitors 32 and 42 are selected to be equal to assist in balancing the respective pairs of windings since their leakage reactancec is distributed and prevents a satisfactory balance using only a single capacitor such as by eliminating capacitor 42 or by providing a single capacitor across output terminals 27 and 28.

A first pair of diodes 36 and 37 respectively connect opposite ends of resonating circuit 33 to the opposite ends of input resonant circuit 14. Diodes 36 and 37 have their cathodes connected to the ends of resonant circuit 14 and thus have the same polarity with respect to circuit 14.

Likewise, a second pair of diodes 46 and 47 are respectively connected between the respective ends of second output resonating circuit 43 and the opposite ends of input resonant circuit 14. The anodes of diodes 46 and 47 and connected to circuit 14 to provide them with opposite polarity from diodes 36 and 37.

Accordingly, the two output resonating circuits are connected in parallel through their respective diodes to input resonant circuit 14. However, the windings of the two output circuits 33 and 43 are connected with opposite polarity with respect to circuit 14.

A carrier source is connected to terminals 51 and 52, and it may be radio frequency. The carrier is preferably square wave in form which provides faster switching characteristics for the diodes than does a sine wave of comparable peak amplitude. Of course, a sine-wave carrier frequency may be used, but more difficulties are encountered in obtaining matched operating characteristics for the diodes. A square wave carrier signal can be obtained by clipping the peaks from a sine wave signal as is well known.

The amplitude of the square carrier wave is chosen at a value that obtains (1) matched conduction points on the diode voltage current characteristics, (2) each such point having linear increments of the diode characteristic extending on both sides, and (3) with the linear increments being sufficiently long to accommodate the peak swings of the audio modulating signal. In effect, the carrier establishes "bias" points on the diodes about which the modulating signal operates. Moreover, when compared to a sine wave that provides the same switching time, the square wave has a much smaller peak amplitude; and consequently for a given amount of output unbalance, it causes a proportionately smaller residual fundamental carrier leak in the output circuit.

The peak amplitude of the carrier wave across each diode is about ten times the peak amplitude of the modulating signal. The input value of the modulating signal at terminals 11 and 12 is dependent upon the turns ratio of transformer $T_1$ as well as the resistive impedances associated with the circuit.

With increased signal due to matching, the linearity of the used incremental portion of each diode characteristic is sufficiently chosen to permit an increased signal current without an increase in odd-order mixer products, due to nonlinearity, which cause intermodulation distortion. Thus, the increase in signal current caused by impedance-matched conditions is without an accompanying increase in distortion and results in a signal-to-distortion ratio increase which has been found to be large in practice.

Terminal 51 is connected to central tap point 53 between resistors 17 and 18 which is effectively a center point for tuned circuit 14. The resistor center tap is much more effective at radio frequencies because it is difficult, if not impossible, to obtain a correct center tap on a transformer winding at a carrier frequency which may be 100 kilocycles for example.

The other carrier input terminal 52 is connected by isolation resistors 54 and 55 to the taps of potentiometers 31 and 41 respectively. Furthermore, potentiometer 31 is by-passed on one side by resistor 56 and on the other side by resistor 57. In a similar manner, potentiometer 41 is by-passed on one side by a resistor 58 and on the other side by a resistor 59. The use of by-pass resistors 56 through 59 increases the fineness of the adjustment of the potentiometers. Where sufficient sensitivity is directly obtainable from the potentiometers, such resistors can be eliminated.

The square wave carrier alternately switches the opposite pairs of diodes open and closed. Due to the steep leading and trailing edges of the carrier square wave, the switching of the diodes is almost instantaneous. Thus, nonlinearities of the diode characteristics in the region of zero current have very little effect upon the operation of the circuit.

Hence, the first pair of diodes 36 and 37 will be conducting while the second pair 46 and 47 is non-conducting, and vice versa. Accordingly, only one output resonating circuit 33 or 43 will be directly connected to input resonant circuit 14 at any one time, since during this time one of the output resonating circuits will be disconnected from input resonant circuit 14 by the very high back resistance of its diodes. By way of example, the diodes have a forward conducting resistance of the order of 100 ohms and backward non-conducting resistance of the order of 1,000,000 ohms.

With respect to the carrier frequency, the windings in each pair are connected in parallel opposing, with the result that their currents cause equal and opposite flux in transformer $T_2$ (when the potentiometer taps are adjusted properly) which cancel and do not induce carrier frequency in output winding 26.

Generally, at radio frequencies such as for example 100 kilocycles-per second, the pairs of windings have unbalanced inductances and unbalanced distributed capacitances which cannot be controlled by transformer tapping to obtain perfect balance. By resonating the inductances of the output transformer by the added capacitors, the output reactance of the circuit is eliminated at the carrier frequency and it is reduced to a resistance. Thus, only the effective resistance of each winding remains to affect the balance and the potentiometers control the resistive balance. Without such resonating, a potentiometer cannot obtain a balance because it cannot control reactive components.

Yet, it has been found that capacitors 32 and 42 do not resonate all of leakage inductances and distributed capacitances associated with the respective pairs of transformer windings even though they permit a carrier balance that is sufficient to obtain a higher order of radio frequency carrier suppression than obtained by an other modulator known.

Figure 2:
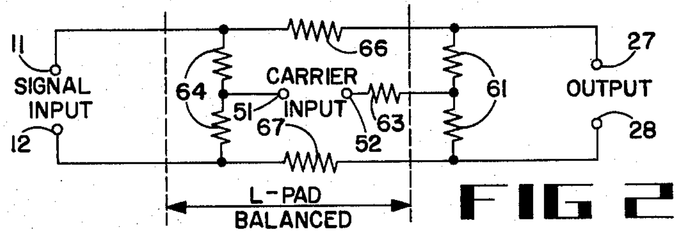
Figure 2 is an equivalent circuit of the impedance situation within the invention.
Figure 3:
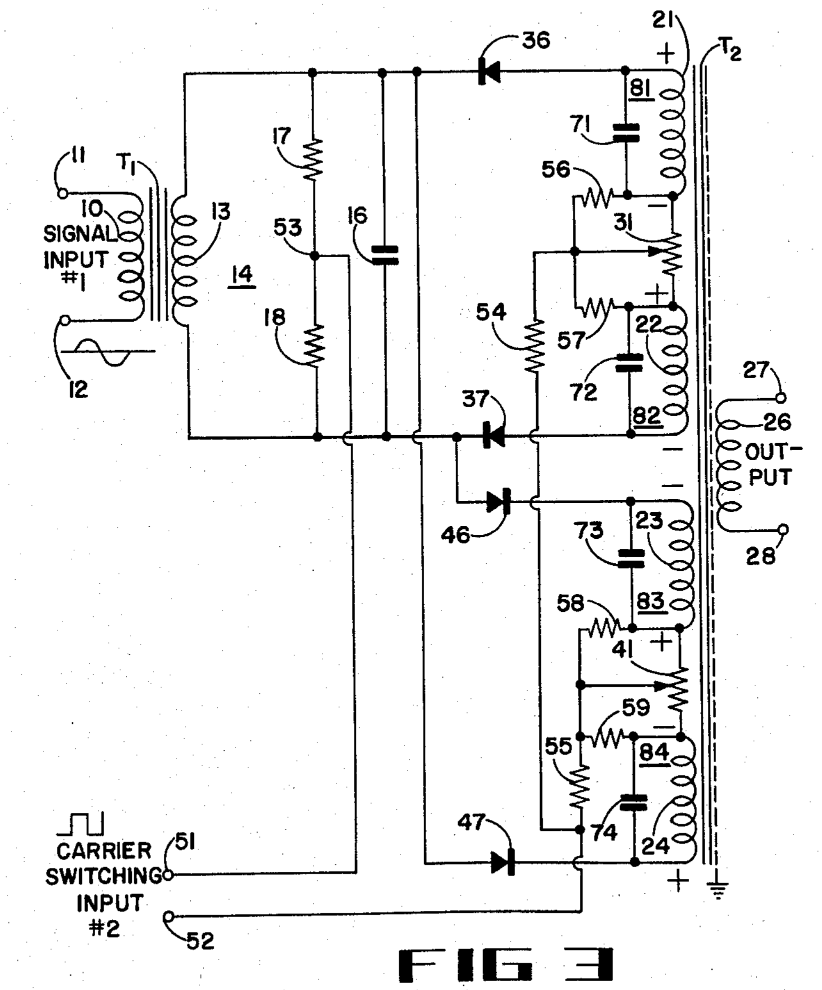
Figure 3 is a schematic diagram of another form of the invention.

The circuit shown in Figure 3 is capable of greater neutralization of leakage reactance than the circuit of Figure 2 and is therefore capable of greater carrier suppression. Capacitors 32 and 42 of Figure 2 are not used in Figure 3. Instead in Figure 3, capacitors 71, 72, 73 and 74 are respectively connected across the winding portions 21, 22, 23 and 24 to provide component resonating circuits 81, 82, 83 and 84 which are effective as a single resonant circuit in the same manner as explained above for the circuits 33 and 43 in Figure 2. The circuits 71 through 74 resonate the output transformer at the carrier frequency.

The resulting resistive impedance situation in the invention is represented in Figure 2. Each effective resonant circuit is reduced to a resistive impedance at the carrier frequency by the alternate connections provided by the diodes. Resonant circuit 14 presents a resistive impedance at its output terminals and is represented in Figure 2 by center-tapped resistors 64. Resistors 64 are the composite parallel resistance of resistors 17 and 18 and transformer $T_1$.

The net resistive impedance of the reflected load and of the combined output circuits 33 or 43 in Figure 1 and of combined circuits 81, 82 or 83, 84 in Figure 3 are represented by respective output resistance provided by tapped resistors 61. The net resistive impedances of opposite output transformer winding pairs are alternately connected into the circuit and therefore only one is representative in Figure 2 by resistors 61. The impedances of the diodes conducting at any one time are represented in Figure 2 by resistors 66 and 67.

The intelligence can be considered as incoming at terminals 11 and 12 and outgoing at terminals 27 and 28 regardless of the frequency change. Note that the resistive network provides an effective balanced L-pad coupling circuit which can be proportioned by controlling the value of resistors 64 to obtain an impedance match between terminals 11 and 12 and the load of resistors 61. Also, such impedance matched conditions eliminate reflected signal energy which would circulate within the modulator with different phase and amplitude than the incident signal energy and combine with the incident signal in the nonlinear diodes to modify the signal thereby causing distortion. The maximum transfer of signal energy also enables an increase in the signal-to-noise ratio since the noise level is not changed.

Furthermore, the transformers are operated in their linear flux regions. As a result of all of the above-described features, a very small amount of carrier leak and a very high signal-to-distortion ratio is obtained of the sideband output.

Although this invention has been described with respect to a particular embodiment thereof, it is not to be so limited as changes and modifications may be made therein which are within the full intended scope of the invention as defined by the appended claims.

I claim:

1. A balanced modulator circuit receiving a switching carrier input and a modulating signal input, comprising an input resonant circuit receiving said signal input, a resistance network connected across said input resonant circuit and having a central point, said resistance network having its value adjusted to provide an impedance match for said input resonance circuit means connecting one side of said carrier input to said central point, an output transformer having an output secondary winding and first and second pairs of primary windings, a first potentiometer connected in series between said first pair of windings, a second potentiometer connected in series between said second pair of windings, capacitor means connected across at least a portion of said output transformer primary windings to resonate the inductance of said output transformer at the frequency of said switching carrier input, a first pair of diodes connecting the opposite ends of said first pair of windings to said input resonant circuit, a second pair of diodes connecting the opposite ends of said second pair of windings to said input resonant circuit, said first pair of diodes connected with one polarity to said input resonant circuit, said second pair of diodes connected with opposite polarity to said input resonant circuit, and a pair of isolation resistors respectively connecting the other side of said carrier input to taps of said potentiometers.

2. A circuit as defined by claim 1 including a transformer coupling said input signal to said input resonant circuit.

3. A circuit as defined in claim 1 with first resistance means shunting said first potentiometer, and second resistance means shunting said second potentiometer.

4. A balanced modulator circuit receiving a switching carrier input and a modulating signal input, comprising an input transformer having its primary receiving said input signal, an input resonant circuit including the secondary of said input transformer, a resistive voltage divider connected across said input resonant circuit and having a central tap point, an output transformer having first and second pairs of nearly equal primary windings and an output secondary winding, first resistance means connecting said first pair of windings to be series aiding, second resistance means connecting said second pair of windings to be series aiding with respect to said modulating signal input, a first capacitor connected across said first pair of windings, a second capacitor connected across said second pair of windings, said first and second capacitors resonating the inductance of said output transformer at the frequency of said carrier input, a first pair of diodes respectively connected between opposite ends of said first pair of windings and said input resonant circuit, each of said first pair of diodes having its cathode connected to said input resonant circuit, a second pair of diodes connected respectively between opposite ends of said second pair of windings and said input resonant circuit, said second pair of diodes having their anodes connected to said input resonant circuit, said first and second pairs of windings switched by said diodes with opposite polarity with respect to said input resonant circuit, each of said first and second resistance means having a tap point, said carrier input connected on one side to the central tap point of said resistive voltage divider, first impedance means connecting the other side of said carrier input to the tap point of said first resistance means, and second impedance means connecting said other side of said carrier input to the tap point of said second resistance means.

5. A balanced modulator circuit having a carrier input and a signal input, comprising an input transformer having its primary receiving said signal input, a capacitor connected across the secondary of said input transformer to resonate its inductance at the frequency of the carrier input, a resistive voltage divider having a central tap point also connected across said secondary of said input transformer, an output transformer having two pairs of similar primary windings and an output secondary winding, a first resistance means connected in series between said first pair of windings, a second resistance means connected in series between said second pair of windings, each pair of windings being connected in a series-aiding manner with respect to said modulating signal, a second capacitor connected across said first pair of windings, a third capacitor connected across said second pair of windings, said first and second capacitors resonating the reactance of said output transformer at the frequency of said carrier input, first and second diodes having their cathodes connected to opposite sides of said first capacitor and their anodes connected to opposite sides of said second capacitor, second and third diodes having their anodes connected to opposite sides of said first capacitor and their cathodes connected to opposite sides of said third capacitor, means connecting said carrier input on one side to the central tap point of said resistive voltage divider, plural resistive means connecting the other side of said carrier input to the central points of said first and second resistance means, and said first and second pairs of windings being connected with opposite polarity with respect to said input transformer secondary.

6. A balanced modulator circuit as defined in claim 5 in which said resistive voltage divider comprises a pair of equal resistors, each of said first and second resistance means comprises first and second potentiometers connected between respective pairs of windings, said plural resistive means comprises a first resistor connected between the tap of said first potentiometer and said carrier input, a second resistor connected between the tap of said second potentiometer and said carrier input, and a plurality of resistors connected respectively between the tap points of said potentiometers and their ends.

7. A balanced modulator circuit for receiving a switching carrier input and a modulating signal input, comprising an input transformer having its primary receiving its input signal, an input resonant circuit including the secondary of said input transformer, a resistive voltage divider connected across said input resonant circuit and having a central tap point, an output transformer having first and second pairs of primary windings and an output secondary winding, first resistance means connecting said first pair of windings to be series aiding with respect to said modulating signal, second resistance means connecting said second pair of windings to be series aiding with respect to said modulating signal; first, second, third and fourth capacitors connected respectively across the windings of said two pairs; said capacitors resonating the inductance of said output transformer at frequency of said switching carrier input, a first pair of diodes respectively connected between opposite ends of said first pair of windings and said input resonant circuit, each of said first pair of diodes having its cathode connected to said input resonant circuit, a second pair of diodes respectively connected between opposite ends of said second pair of windings and said input resonant circuit, each of said second pair of diodes having their anodes connected to said input resonant circuit, said first and second pairs of windings connected respectively by said diodes with opposite polarity with respect to said input resonant circuit, each of said first and second resistance means having a tap point, said carrier input connected on one side to the central tap point of said resistive voltage divider, first impedance means connecting the other side of said carrier input to the tap point of said first resistance means, and second impedance means connecting said other side of said carrier input to the tap point of said second resistance means.

References Cited in the file of this patent

UNITED STATES PATENTS

| | | |
|---|---|---|
| 2,455,732 | Carter | Dec. 7, 1948 |
| 2,469,222 | Atwood et al. | May 3, 1949 |
| 2,545,250 | Appert | Mar. 13, 1951 |
| 2,676,304 | Ensink et al. | Apr. 20, 1954 |

FOREIGN PATENTS

| | | |
|---|---|---|
| 152,142 | Australia | July 5, 1951 |
| 158,904 | Australia | Oct. 29, 1953 |
| 604,803 | Great Britain | July 9, 1948 |